April 5, 1960     A. Y. JOHNSON     2,931,637
RATIO CONVERSION ATTACHMENT FOR PLATFORM SCALE
Filed June 11, 1956
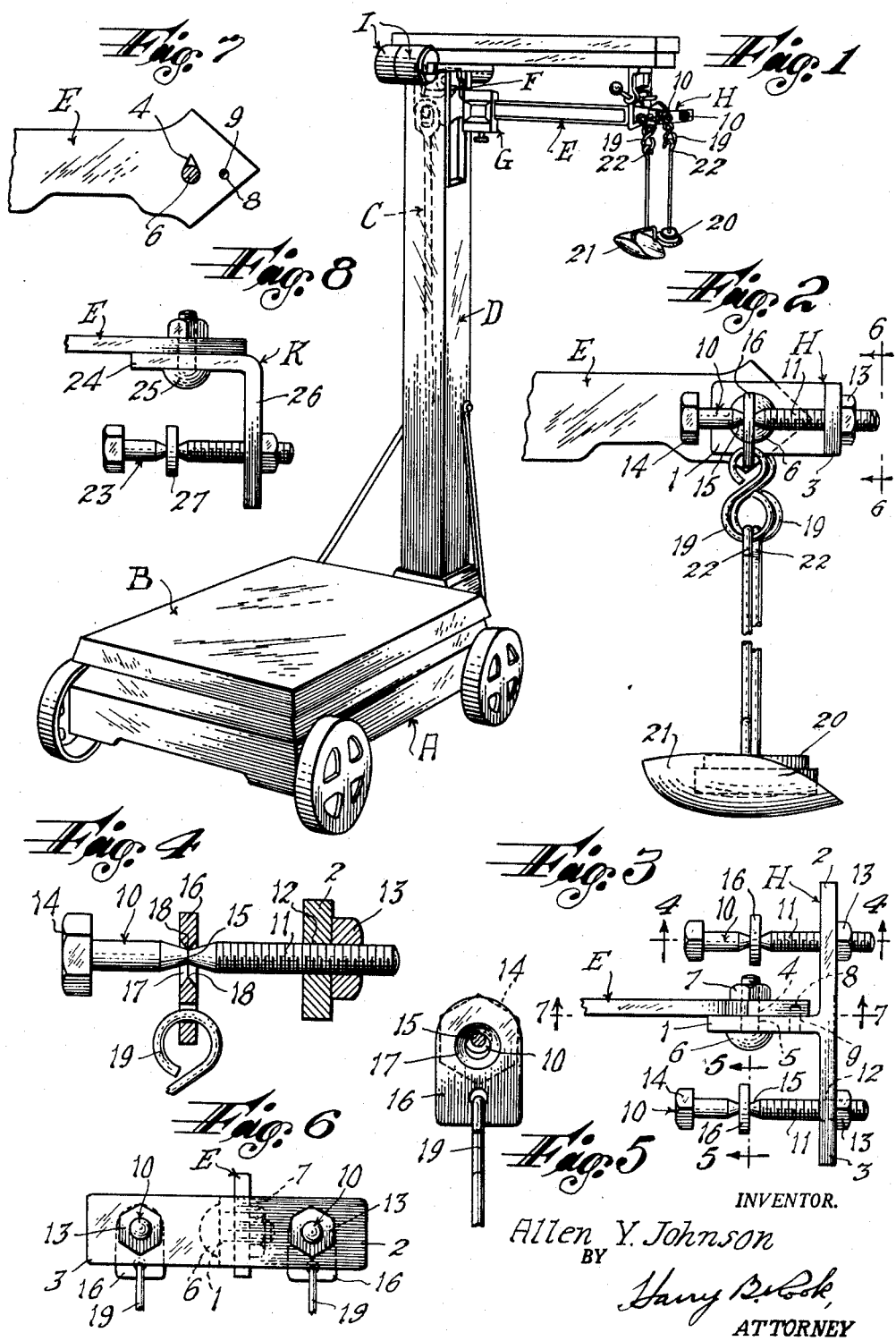
INVENTOR.
Allen Y. Johnson
BY
Harry B. Cook,
ATTORNEY

United States Patent Office 2,931,637
Patented Apr. 5, 1960

2,931,637

RATIO CONVERSION ATTACHMENT FOR PLATFORM SCALE

Allen Y. Johnson, West Caldwell, N.J., assignor to Johnson Scale Co., Newark, N.J., a corporation of New Jersey Application June 11, 1956, Serial No. 590,505

3 Claims. (Cl. 265—30)

This invention relates in general to an attachment to be secured to the beam of, for example, an ordinary platform scale for adjusting or changing the normal ratio of the scale. More particularly, the invention is directed to such an attachment for converting a platform scale into a counting scale.

It is well known that a platform scale usually is constructed so that a counterpoise of for example one pound suspended from the scale beam will balance one hundred pounds on the platform of the scale. For counting purposes, frequently it is desirable to have a different ratio so that, for example, one article in a pan substituted for the counterpoise will balance ninety-nine articles on the platform; and the invention contemplates an attachment for the scale beam which shall permit the scale to be used either for weighing purposes at the normal ratio of, for example 100 to 1 or for counting purposes at, for example, a 99 to 1 ratio, with a minimum of change or adjustment of the basic scale structure.

A prime object of the present invention is to provide a novel and improved ratio conversion attachment for the beam of a platform scale connected to the tip or counterpoise end of the scale beam and including one or more adjustable pivot and bearing assemblies for suspending a counterpoise and a counting pan on the scale beam.

Another object is to provide such a conversion attachment which shall constitute a substitute for the usual counterpoise loop and the knife edge pivot therefor provided on a scale beam and which shall have at least one adjustable fulcrum or pivot upon which either a counterpoise or a counting pan may be hung.

A further object is to provide a conversion attachment of this character which shall comprise a bracket secured to the scale beam by a fastener such as a bolt secured in the opening from which the usual counterpoise loop knife edge pivot has been removed, said bracket having one or more arms projecting from the scale beam and each arm having a pivot or fulcrum which is adjustable longitudinally of the scale beam and is constructed to support a counterpoise or a counting pan.

Other objects, advantages and results of the invention will be brought out by the following description in conjunction with the accompanying drawings in which—

Figure 1 is a perspective view of a known type of platform scale having a ratio conversion attachment embodying the invention connected to the beam scale;

Figure 2 is an enlarged fragmentary front elevation of the tip end of the scale beam and the ratio conversion attachment embodying the invention, as illustrated in Figure 1;

Figure 3 is a top plan view of the scale beam and the ratio conversion attachment as illustrated in Figure 2;

Figure 4 is a further enlarged vertical sectional view approximately on the plane of the line 4—4 of Figure 3;

Figure 5 is an enlarged transverse sectional view on the plane of the line 5—5 of Figure 3;

Figure 6 is a side elevation of the ratio conversion attachment and the scale beam approximately on the plane of the line 6—6 of Figure 2;

Figure 7 is a vertical sectional view on the plane of the line 7—7 of Figure 3 with portions omitted for clearness in illustration; and Figure 8 is a view similar to Figure 3 showing a modification of the invention.

Specifically describing the embodiment of the invention illustrated in Figures 1–7 inclusive, the reference character A designates the base of a known type of platform scale which has a platform B supported by a lever system (not shown) which is in turn connected to a beam rod or steelyard rod C within the pillar or column D, the upper end of the beam rod having the usual connection with the butt end of a beam E that is mounted on the pillar D by a fulcrum F in the usual manner. Slidably mounted on the beam as usual is a poise G, and in accordance with the invention, at the tip end of the beam is mounted a ratio conversion attachment H.

The conversion attachment H comprises a bracket that may have one or more adjustable pivots or fulcrums for counterpoises and for counting pans. Figures 1–6 inclusive show a ratio conversion attachment having two such adjustable pivots, while Figure 8 shows an attachment having only one adjustable pivot.

As shown in Figures 1–7 inclusive the bracket has a stem portion 1 from which project two arms 2 and 3. Preferably these arms are disposed at approximately right angles to the stem 1 and project in opposite directions from the stem so that when the stem is disposed in abutting relation to one side of the scale beam E, one of the arms is disposed at each side of the scale beam as best shown in Figure 3.

Preparatory to mounting the bracket on the scale beam, the usual knife edge pivot pin and counterpoise loop are removed from the beam leaving the opening 4 in which the knife edge pivot pin was secured. An opening 5 is formed in the bracket stem 1 and a fastening element such as a bolt 6 is inserted through said opening and through the opening 4 on the scale beam, the nut 7 of the bolt being tightened to firmly clamp the bracket against movement on the beam. Preferably a small recess 8 is provided in the scale beam to receive a pin 9 which is secured to the bracket stem, to cooperate with the bolt in preventing rotation of the bracket on the scale beam.

Adjustably mounted on each arm 2 and 3 of the bracket is a pivot and bearing assembly including pivot member 10. These pivot members may be identical and each is shown as comprising an elongate shank having a screw threaded end portion 11 screwed into an opening 12 in the corresponding bracket arm and having a locknut 13 for locking the shank in adjusted position in the arm. The other end of the shank has a head 14 to facilitate rotation of the shank. Intermediate the threaded end portion and the head 14 the shank has a V-shaped circumferential pivot groove 15 for a bearing plate 16 that has an opening 17 through which loosely extends the shank of the pivot member and which preferably has a knife edge 18 to seat in the bottom of the pivot groove 15 as best shown in Figures 4 and 5. Connected to and suspended from the plate 16 is a looped hanger 19 for the usual scale counterpoise 20 or an article pan 21 each of which has a hook 22 for separable connection to one of the hanger loops 19. The pivot members 10 preferably are disposed approximately parallel to the scale beam and at opposite sides thereof as shown in Figure 3 when the bracket is attached to the scale beam, and the pivot members are adjustable longitudinally of themselves and of the scale beam so that the scale ratio can be easily and quickly changed. For example, normally the pivot member on which the counterpoise is hung might be adjusted so as to balance the scale in the same manner as if the counterpoise were suspended from the usual or regular counterpoise loop and knife edge, whereby to adapt the scale for ordinary weighing purposes with, for example, a ratio of 100 to 1.

For converting the scale for counting purposes, the article pan 21 may be hung on the other pivot member and said pivot member may be adjusted to change the scale ratio to, for example, 99 to 1.

With this construction, it will be observed that the scale ratio can be easily and quickly changed without any substantial change or adjustment of the basic scale structure, such as changing the lever system beneath the platform, and so as to allow the use of standard weights I for weighing purposes instead of requiring special weights for use in the counting pan which would be necessary for weighing purposes if the scale were permanently changed to operate for counting purposes on a ratio other than the normal weighing ratio of, for example, 100 to 1.

While Figure 3 shows a bracket having 2 adjustable pivot members, three or more adjustable pivots, or only one pivot member may be provided. Figure 8 shows a conversion bracket K having only one adjustable pivot member 23, the bracket comprising a stem or body portion 24 that is secured to the scale beam by a bolt 25 in exactly the same manner in which the bracket stem 1 is attached to the beam; and the stem or body 24 has one arm 26 projecting therefrom in the same manner as the arm 3 projects from the stem 1. The pivot member 23 may be identical with the pivot member 10 and mounted in the arm 26 in the same manner in which the pivot member 10 is mounted in the arm 2 or 3; and the bearing plate 27 is identical with the plate 16 and has connected thereto a looped hanger to which the hook of either a counterpoise or an article counting pan may be connected. The pivot member may be adjusted as desired longitudinally of the scale beam to vary the scale ratio for either weighing purposes or for counting articles at different ratios.

It will be understood by those skilled in the art that while I have illustrated and described two presently preferred embodiments of the invention, the structural details of the conversion attachment and the manner of attaching it to the scale beam may be modified within the spirit and scope of the invention.

What I claim is:

1. A ratio conversion attachment for a scale of the beam type whose beam is fulcrumed intermediate its ends and has on its weight end a counterpoise loop and a knife edge pivot pin therefor, said attachment comprising a bracket having a stem portion and an arm extending angularly therefrom, means to secure said stem portion to said beam in place of said knife edge pivot pin, a pivot member mounted in said arm for adjustment longitudinally of the scale beam when said stem portion is secured to the beam, and a hanger for a counterpoise or for a counting pan pivotally suspended on said pivot member, said pivot member comprising an elongated shank parallel to said stem portion and adjustable longitudinally and having a pivot groove therein, and said hanger being pivotally mounted in said groove.

2. A ratio conversion attachment as defined in claim 1 wherein said pivot member has a portion of its shank screw threaded into said arm, whereby the pivot member is adjustable longitudinally upon rotation thereof.

3. A ratio conversion attachment as defined in claim 1 wherein said bracket has another arm extending therefrom in the opposite direction from the first-mentioned arm, and with the addition of a second pivot member adjustably mounted in the second mentioned arm, and a second such hanger pivotally suspended on said second pivot member.

References Cited in the file of this patent
UNITED STATES PATENTS

| Re. 23,595 | Menze | Dec. 9, 1952 |
| 1,309,602 | Brophy | July 8, 1919 |
| 1,713,774 | Mittendorf | May 21, 1929 |
| 1,715,832 | Hapgood | June 4, 1929 |
| 1,741,416 | Hem | Dec. 31, 1929 |
| 2,250,294 | Carliss | July 22, 1941 |
| 2,484,324 | Thorsson | Oct. 11, 1949 |
| 2,516,046 | Cousineau | July 18, 1950 |